April 26, 1960   H. M. LOCKHART   2,934,095
FLEXIBLE METAL CONDUIT

Filed June 14, 1956   2 Sheets-Sheet 1

INVENTOR.
Hugh M. Lockhart
BY Ooms, McDougall,
Williams & Hersh
Attorneys

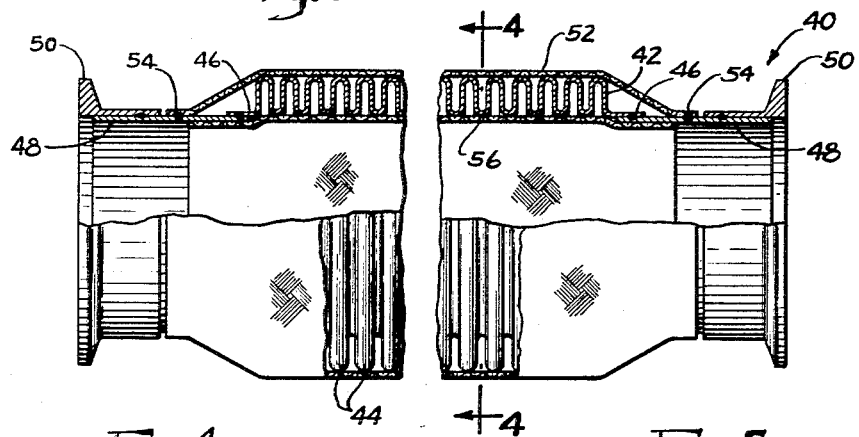
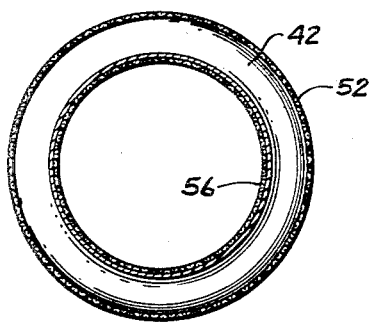
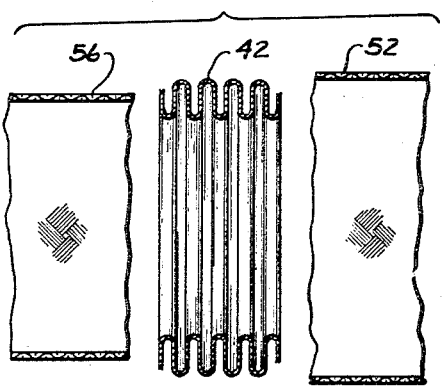
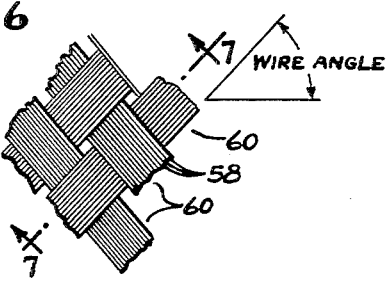
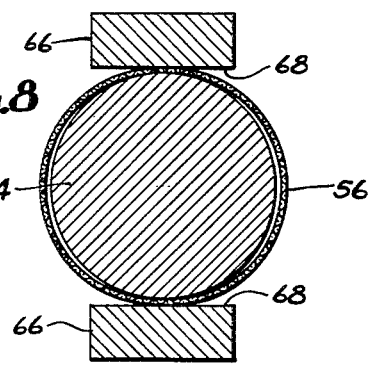
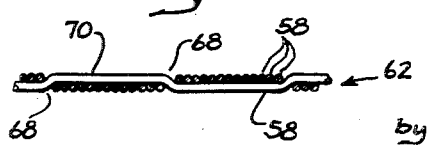

United States Patent Office 2,934,095
Patented Apr. 26, 1960

2,934,095

FLEXIBLE METAL CONDUIT

Hugh M. Lockhart, Geneva, Ill., assignor to Dunbar Kapple, Inc., a corporation of Illinois Application June 14, 1956, Serial No. 591,309

13 Claims. (Cl. 138—50)

This invention relates to conduits for carrying fluids, and particularly to flexible conduits, bellows, hose or the like, made of convoluted sheet metal or other suitable material. This application is a continuation-in-part of my application, Serial No. 518,099, filed June 27, 1955, and now abandoned.

One principal object of the invention is to provide a new and improved conduit in which a spirally braided liner is employed with an irregular conduit wall in order to smooth out the irregularities in the wall and thereby minimize turbulence and pressure drop in the conduit.

Another object is to provide a new and improved conduit of the foregoing character in which the conduit wall is impervious, so as to contain the fluid, while the liner is somewhat pervious to the fluid, so that the fluid may enter and occupy the space between the liner and the outer wall, the fluid thereby serving to back up the liner.

A further object is to provide a new and improved conduit comprising convoluted sheet metal tubing which is lined with spirally braided strands of wire so as to smooth over the undulating inner surface of the convoluted tubing.

A further object is to provide a new and improved hose comprising a convoluted metal conduit having an oversize wire braid liner which tends to spring outwardly by its own inherent resilience so that it will remain in engagement with the inside of the convoluted conduit, even under conditions of rapid fluid flow through the hose.

It is a further object to provide a new and improved hose or the like comprising a convoluted metal conduit having a wire braid liner having a wall which is squeezed or flattened so that its inner surface will be as nearly cylindrical as possible and will have a minimum of surface roughness.

Another object is to provide a new and improved hose comprising a convoluted metal conduit having a wire braid liner in which the angle between the wire strands and the longitudinal axis of the liner is controlled to minimize resistance to fluid flow through the hose.

It is another object to provide a new and improved hose comprising a convoluted metal conduit provided with a resilient wire braid liner which, in its free state, has an outside diameter substantially greater than the inside diameter of the convoluted conduit, so that the wire braid liner springs outwardly against the inside thereof by its own resilience, the liner being inserted by stretching it lengthwise or constricting it radially to reduce its diameter.

Further objects and advantages of the invention will appear from the following description, taken with the accompanying drawings, in which:

Fig. 3 is an elevational view, partly in longitudinal section, of a modified flexible conduit constituting a second illustrative embodiment of the invention.

Fig. 4 is a cross sectional view taken generally along the line 4—4 in Fig. 3.

Fig. 5 is a fragmentary exploded longitudinal sectional view of the conduit of Fig. 3.

Fig. 6 is an enlarged fragmentary developed elevational view of the inside of a wire braid liner embodied in the flexible conduit of Fig. 3.

Fig. 7 is a greatly enlarged cross sectional view taken through the wall of the liner, generally along a line 7—7 in Fig. 6.

Fig. 8 is a somewhat diagrammatic cross sectional view showing one method of flattening or smoothing the wall of the braided liner employed in the flexible conduit of Fig. 3.

Figure 1:
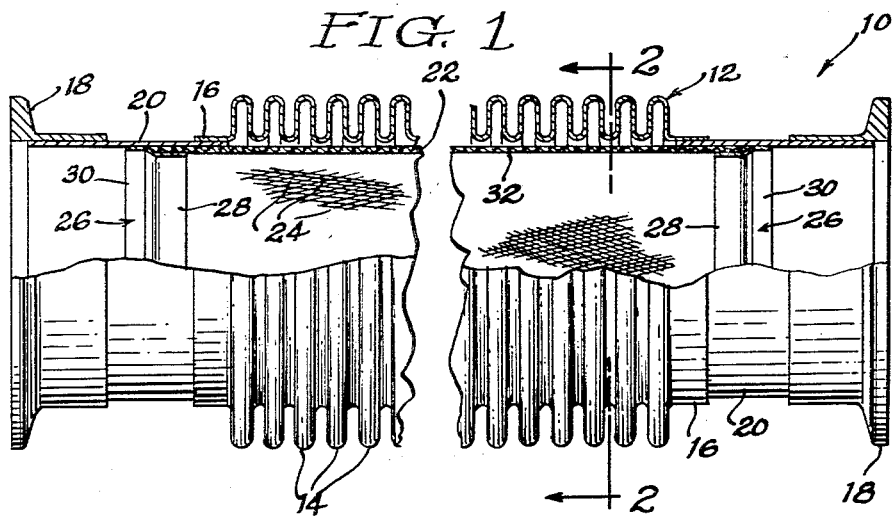
Fig. 1 is an elevational view of a flexible conduit constituting an illustrative embodiment of the invention, the view being partly in longitudinal section.
Figure 2:
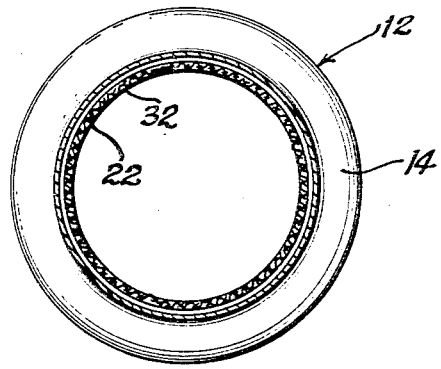
Fig. 2 is a cross sectional view taken along a line 2—2 in Fig. 1.

It will be seen that the drawings illustrate a flexible conduit 10 which comprises any desired length of convoluted or corrugated tubing 12. Preferably, the tubing 12 is made of sheet metal, but it will be understood that some aspects of the invention are applicable to flexible tubing made of other materials, such as plastics or other organic materials, for example. In fact, in some respects the invention is applicable to any type of conduit having an undulating, irregular or rough inner surface which would tend to cause turbulence and excessive pressure drop in a fluid flowing through the conduit.

It will be seen that the illustrated tubing 12 comprises a plurality of longitudinally spaced convolutions or folds 14 which extend around the periphery of the tubing. As illustrated, the convolutions 14 are annular, but they could equally well be spiral or helical, for example. Each end of the tubing 12 has a cylindrical stub 16 which is connected to a mounting flange 18 by means of a cylindrical sheet metal sleeve 20. It will be understood that the sleeve 20 may be welded or otherwise secured to the stub 16 and the mounting flange 18.

If the flexible tube or hose 12, as thus far described, were used to carry fluid, the undulating inner surface elements of the convolutions 14 would cause considerable turbulence in the stream of fluid, particularly at high rates of flow. The turbulence, in turn, would result in considerable pressure drop in the fluid flowing through the conduit.

To minimize turbulence and pressure drop, the illustrated convoluted metal hose 12 is provided with a flexible liner 22 made of a plurality of woven or braided strands 24. Preferably, the strands 24 are made of metal wire and are spirally braided. However, it will be understood that some aspects of the invention are applicable to a liner made of woven or braided strands composed of plastics or various natural or synthetic fibers, for example.

The illustrated metal braid 22 is mounted within the convoluted tubing 12 by means of mounting sleeves 26, which are welded or otherwise secured between the ends of the braid and the sleeve 20. Each of the mounting sleeves 26 has a reduced portion 28 which is received within the braid 22. At the opposite end, each mounting sleeve 26 has a larger portion 30 which fits within the corresponding sleeve 20.

It is preferred that the braid 22 be closely woven so that it will present a fairly smooth inner surface 32 to the stream of fluid flowing through the conduit. However, it is preferred that the braid be somewhat pervious to the fluid, so that the fluid will seep through the braid and occupy the irregularly shaped space between the liner braid and the convoluted tubing 12. In this way, a dead or relatively inactive body of fluid will be formed between the outer wall and the liner. Very little flow will take place in this inactive body of fluid, but the fluid will back up the braid and thereby tend to prevent fluid pressure from forcing the braid into the convolutions 14.

Accordingly, the provision of a pervious liner braid will tend to maintain the original smoothness of the liner. The liner will thereby smooth over the convolutions to the greatest possible extent. With regard to the perviousness of the liner, it has been found in actual tests that a closely woven wire braid having ninety-eight per cent of its surface closed by the wire strands is quite satisfactory. The provision of such a liner has been found to greatly reduce the turbulence and pressure drop that otherwise occurs in convoluted metal tubing. In addition to facilitating the flow of fluid through the convoluted hose, the liner braid has a marked dampening effect upon vibrations which tend to occur in the hose due to its resilient nature. When the liner is not present, there is a tendency for resonant vibrations to be set up in the hose, due to the flow of fluid through the hose. Such vibrations may tend to weaken the hose, even to the point of causing a fatigue failure. When the liner braid is mounted in the convoluted hose, the turbulence in the fluid is greatly reduced, with the result that the fluid flows much more smoothly through the hose. This in itself tends to minimize vibrations in the hose. It has been found, moreover, that the braid has a considerable dampening effect upon any vibrations which may be set up in the hose. The dampening effect is partly due to the braid itself and partly to the presence of the inert body of fluid between the braid and the convoluted hose. The dampening action of the braid greatly reduces the tendency for the hose to vibrate. Thus the braid prolongs the life and increases the serviceability of the hose.

Figs. 3–8 pertain to a modified hose or flexible conduit 40 which also employs a convoluted conduit or tube 42, preferably made of metal. A plurality of longitudinally spaced convolutions 44 extend around the periphery of the convoluted conduit 12. The convolutions 44 may be annular and parallel to one another, as illustrated, or they may be spiral or helical. It will be understood that the convoluted conduit 42 is impervious to fluid.

In this instance, each end of the convoluted conduit 42 has a cylindrical stub 46 which is welded or otherwise secured to a tubular end fitting or bushing 48. A flange 50 may be welded or otherwise secured to the end of the bushing 48.

To protect and reinforce the convoluted conduit 42, and to resist elongation thereof, a sheath 52 is provided around the convoluted conduit 42. The sheath 52 is preferably made of wire braid. As shown, the sheath 52 is stretched tightly over the convoluted conduit. The ends of the sheath are suitably secured to the ends of the convoluted conduit 42. More specifically, each end of the illustrated wire braid sheath 52 is welded or otherwise secured to the outside of the corresponding bushing 48 which is connected to the end of the convoluted conduit 42. The weld between the sheath 52 and the bushing 48 may be formed by electric seam welding, as indicated at 54.

The wire braid sheath 52 resists any elongation of the convoluted conduit 42, from whatever cause. Of course, the convoluted conduit 42 is quite flexible and resilient and, in the absence of the sheath 52, may be elongated by the application of longitudinal tension to the convoluted conduit. Such tension may be due to external force, or it may be due to the presence of fluid pressure in the conduit 42. The sheath 52 takes up the tension and resists elongation of the convoluted conduit 42. When tension is applied to the wire braid sheath 52, the sheath applies compressive force to the outside of the convoluted conduit 42. Due to the peripheral conformation of the convolutions 44, the conduit 42 is well able to resist this compressive force. Moreover, the compressive force, applied by the wire braid sheath 52, tends to neutralize the circumferential tension that would otherwise be produced in the convoluted conduit 42 by fluid pressure in the conduit.

Within the convoluted conduit 42 is a liner 56, which preferably is made of spirally braided, tubular wire braid. The braided liner 56 smooths over the undulating surface presented by the convolutions 44. Thus the liner 56 presents a relatively smooth, unbroken inner surface to the fluid carried by the hose 40. Accordingly, the braided liner 56 thus greatly reduces frictional resistance offered by the hose 40 to the passage of fluid therethrough. The liner 56 thus greatly reduces the pressure drop in the fluid passing through the hose.

It has been found to be highly advantageous to arrange the braided liner 56 so that it will engage the innermost elements of the convoluted conduit 42. Thus it is preferred to employ an oversize tubular braid for the liner 56, as illustrated in Fig. 5. In other words, the liner 56 is spirally braided on a mandrel which is substantially larger in diameter than the inside diameter of the convoluted conduit 42 with which the braid is to be employed. The exact size of the braided liner 56 may be varied to a considerable extent. In one successful hose, for example, the liner was braided on a mandrel having a diameter of 2⅝ inches, while the inside diameter of the convoluted tubing, employed with the braid, was only 2⅛ inches. Thus, in this case, the free state inside diameter of the braid was about ½ inch greater than the inside diameter of the convoluted tubing.

The oversize braided liner 56 may be inserted into the convoluted tubing 42 by constricting the braid 56 as it is fed into the convoluted tubing. The braid may be constricted by hand or by any suitable apparatus. It is quite easy to constrict the braid because it is highly flexible. The constriction of the braid results in some elongation thereof. Conversely, stretching the braid longitudinally will constrict it so that its diameter will be reduced. Thus, a given segment of the braid is longer when in place in the convoluted tubing than it is in a free state. When the braided liner 56 is within the convoluted conduit 42, the liner expands outwardly by its own resilience against the inside of the convoluted conduit. Thus, the braided liner 56 firmly engages the inside of the convoluted conduit 42, even when a liquid is passing through the hose at a high velocity, and when the hose is flexed, as it is when it is handled, reeled or unreeled. Employing the oversize braid virtually eliminates any tendency for the braid to pull away from the inside of the convoluted conduit, or, to stretch, bunch up or form gathers, which might cause a partial restriction in the hose.

The free-state diameter of the oversize braided liner 56 may be as great as three times the inside diameter of the convoluted conduit 42. It will be understood that the free-state diameter of the oversize liner may be varied to a considerable extent.

The liner 56 for the convoluted conduit 42 may be of the usual type of tubular wire braid, comprising a large number of wire strands 58 braided in groups 60 which pass over and under one another alternately. Each of the strands 58 extends helically along the wall of the braid, at a substantially constant angle to the longitudinal axis of the braid. This angle is known as the wire angle of the braid. In Fig. 6, the wire angle is indicated by an appropriate legend. Tubular wire braid may be braided with virtually any wire angle, between zero and ninety degrees. However, it has been found that the pressure drop in the hose may be minimized by controlling the wire angle. In the successful hose referred to previously, the wire angle was about 48 degrees with the braid in place in the convoluted conduit 42. However, the wire angle may range between twenty-one and fifty-eight degrees.

In order to reduce the pressure drop in the hose 40, it is preferred that the braided liner 56 be formed with a flattened or smoothed wall 62, as shown diagrammatically in Fig. 7. As the wire braid 56 is originally braided, the wire strands 58 cross over fairly gradually, with the result that the inner surface of the braid is slightly undulating or wavy. The inner surface of the braid 56 can be smoothed out considerably by flattening or squeezing the wall 62 of the braid between smooth pressing instruments in the form of bars, rods or the like, before the braid is inserted into the convoluted conduit 42.

The flattening or smoothing of the braided wall 62 may be accomplished in a variety of ways. Fig. 8 illustrates one method that has been employed successfully. In this instance, the wire braid 56 was slipped over a smooth round bar or rod 64. It is preferred that the diameter of the rod 64 be somewhat less than the diameter of the mandrel on which the braid was formed. Thus, the diameter of the rod 64 was 2½ inches, as used in smoothing the wall of the braided liner 56 for the successful hose previously mentioned. Pressure may be applied to the wall of the braid 56 by means of a pair of bars 66 or the like, which may be pressed toward each other by a suitable press or the like. As shown, the bars 66 have smooth flat surfaces 68 which engage the outside of the braid 56 at diametrically opposite points. The bars 66 press the braid against the outside of the round bar 64. The shape of the surfaces 68 may be other than flat, if desired. Thus, the surfaces may be somewhat concave.

In the method illustrated in Fig. 8, the braid 56 is squeezed or pressed a little at a time. Between each squeezing operation, the braid 56 is shifted circumferentially by a slight amount so that each longitudinal element of the braid is brought under the pressing bars 66 in turn. The pressure employed in the smoothing operation is sufficient to smooth out the braid without causing structural damage thereto. As shown in Fig. 7, the smoothed wall 62 of the braid has fairly definite crossovers 68. The wires 58 have smooth portions 70 extending between the crossovers, along the unbroken cylindrical line of curvature of the inside of the braid. It will be realized that Fig. 7 is a developed view so that the wire portions 70 appear straight, but actually they curve slightly along the natural curvature of the braid.

The preferred form of the braided liner 56 reduces the pressure drop through the hose 40 to a truly remarkable extent. Thus the resistance afforded to the flow of fluid through the lined hose 40 is only a small fraction of the resistance that would be afforded by the convoluted conduit 42. The inherent smoothing action of the braid, the provision of an oversize liner, the controlling of the wire angle, and the smoothing or pressing of the braided wall combine to produce this great reduction in frictional resistance to the flow of fluid.

By making the hose 40 entirely out of metal, the inherent high flexibility of the hose is maintained under virtually all conditions, even when the temperature of the hose is extremely low. Thus, the metal hose will reel and unreel easily at the sub-zero temperatures which prevail at the high altitudes frequented by modern aircraft. Moreover, the metal hose will withstand reeling, unreeling and severe handling at such sub-zero temperatures. Accordingly, the hose is ideal for carrying fuel from one airplane to another, in refueling operations carried on with the airplanes in flight. This is only one of many applications of the hose.

For use in refueling in flight, the braided liner minimizes the pressure drop through the hose, so that it is possible to transfer a large amount of fuel through the hose in a short time with a minimum of pumping capacity. Thus the refueling operation may be carried out expeditiously. The size and weight of the pump on the refueling aircraft may be small. Even when the fuel is flowing at a high velocity through the metal hose, the braided liner will remain in engagement with the inside of the convoluted tubing. The braided liner will not stretch or gather so as to cause a partial restriction. Elongation of the hose is resisted and minimized by the braided sheath 52. Thus the sheath also prevents the braided liner from being stretched due to elongation of the hose by externally applied tension or fluid pressure therein.

Various modifications, alternative constructions and equivalents may be employed without departing from the true spirit and scope of the invention as exemplified in the foregoing description and defined in the following claims.

I claim:

1. In a metal hose, the combination comprising a convoluted tubular metal conduit having convolutions extending around the periphery thereof to impart flexibility to said conduit, a metal wire braid sheath received around and engaging the outside of said convoluted conduit, said sheath having its ends connected to the ends of said conduit so that said sheath will resist elongation thereof, and an oversize metal wire braid liner disposed in a constricted condition within said convoluted conduit and engaging the inside thereof to smooth the inside surface of said hose and minimize resistance to flow of fluid therethrough, said liner being resiliently biased outwardly by its own inherent resilience into engagement with the inside of said convoluted conduit, said liner being pervious to fluid to provide for entry of fluid into the spaces between said convoluted conduit and said liner, said liner having its wall compressed to smooth the inside of said liner into nearly cylindrical shape with a minimum of surface roughness.

2. In a metal hose, the combination comprising a convoluted tubular metal conduit having convolutions extending around the periphery thereof to impart flexibility to said conduit, a metal wire braid sheath received around and engaging the outside of said convoluted conduit, said sheath having its ends connected to the ends of said conduit so that said sheath will resist elongation thereof, and an oversize metal wire braid liner disposed in a constricted condition within said convoluted conduit and engaging the inside thereof to smooth the inside surface of said hose and minimize resistance to flow of fluid therethrough, said liner being resiliently biased outwardly by its own inherent resilience into engagement with the inside of said convoluted conduit, said liner being pervious to fluid to provide for entry of fluid into the spaces between said convoluted conduit and said liner.

3. In a metal hose, the combination comprising a convoluted tubular metal conduit having convolutions extending around the periphery thereof to impart flexibility to said conduit, and an oversize metal wire braid liner disposed in a constricted condition within said convoluted conduit and engaging the inside thereof to smooth the inside surface of said hose and minimize resistance to flow of fluid therethrough, said liner being resiliently biased outwardly by its own inherent resilience into engagement with the inside of said convoluted conduit.

4. In a metal hose, the combination comprising a flexible impervious metal conduit having a plurality of convolutions extending therearound, said conduit thereby having an undulating inner surface, a wire braid sheath closely received around said flexible conduit and having its ends secured to the ends thereof for resisting elongation of said flexible conduit, and a generally cylindrical metallic wire braid liner closely received within said flexible metal conduit for smoothing over said undulating inner surface of said conduit and providing a relatively smooth inner surface for said hose to minimize the resistance afforded by said hose to flow of fluid therethrough, said liner when in a free state being of a substantially larger outer diameter than the inner diameter of said flexible conduit, said liner when in said flexible conduit being resiliently constricted and thereby being biased outwardly by its own resilience into engagement with the inside of said flexible conduit.

5. In a metal hose, the combination comprising a flexible impervious metal conduit having a plurality of convolutions extending therearound, said conduit thereby having an undulating inner surface, and a generally cylindrical metallic wire braid liner closely received within said flexible metal conduit for smoothing over said undulating inner surface of said conduit and providing a relatively smooth inner surface for said hose to minimize the resistance afforded by said hose to flow of fluid therethrough, said liner when in a free state being of a substantially larger outer diameter than the inner diameter of said flexible conduit, said liner when in said flexible conduit being resiliently constricted and thereby being biased outwardly by its own resilience into engagement with the inside of said flexible conduit.

6. In a method of making a metal hose, the operations comprising, forming a convoluted tubular metal conduit with convolutions extending around the periphery thereof, braiding a wire braid liner to an outside diameter substantially greater than the inside diameter of said convoluted conduit, applying squeezing pressure to the wall of said liner to smooth the inside of said liner into nearly cylindrical shape with a minimum of surface roughness, and inserting said liner into said convoluted conduit while resiliently constricting said liner so that it will fit snugly in said conduit and will expand outwardly by its own resilience into engagement with the inside thereof.

7. In a method of making a metal hose, the operations comprising, forming a convoluted tubular metal conduit with convolutions extending around the periphery thereof, braiding a wire braid liner to an outside diameter substantially greater than the inside diameter of said convoluted conduit, and inserting said liner into said convoluted conduit while resiliently constricting said liner so that it will fit snugly in said conduit and will expand outwardly by its own resilience into engagement with the inside thereof.

8. In a method of making a metal hose, the operations comprising, providing a convoluted tubular metal conduit with convolutions extending around the periphery thereof, mounting a metal wire braid sheath around said convoluted conduit in engagement with the outside thereof, connecting the ends of said sheath to the ends of said conduit so that said sheath will resist elongation of said conduit, braiding a wire braid liner to an outside diameter substantially greater than the inside diameter of said convoluted conduit, applying squeezing pressure to the wall of said liner to smooth the inside of said liner into nearly cylindrical shape with a minimum of surface roughness, and inserting said liner into said convoluted conduit while resiliently constricting said liner so that it will fit snugly in said conduit and will expand outwardly by its own resilience into engagement with the inside thereof.

9. In a method of making a metal hose, the operations comprising, providing a convoluted tubular metal conduit with convolutions extending around the periphery thereof, mounting a metal wire braid sheath around said convoluted conduit in engagement with the outside thereof, connecting the ends of said sheath to the ends of said conduit so that said sheath will resist elongation of said conduit, braiding a wire braid liner to an outside diameter substantially greater than the inside diameter of said convoluted conduit, and inserting said liner into said convoluted conduit while resiliently constricting said liner so that it will fit snugly in said conduit and will expand outwardly by its own resilience into engagement with the inside thereof.

10. In a method of making a metal hose, the operations comprising, providing a corrugated tubular sheet metal conduit having its corrugations extending around the periphery thereof to impart flexibility to said conduit, providing a substantially cylindrical wire braid liner having an outside diameter as great as the inside diameter of said conduit, applying squeezing pressure to the wall of said liner between smooth pressing bars to smooth the inside of said liner so that said liner will have a minimum of surface roughness, said pressing bars being oriented to extend parallel to the axis of said liner, one of said pressing bars being applied to the outside of said liner while the other pressing bar is inserted within said liner and applied against the inside thereof, disassociating said bars from said liner and inserting said liner into said corrugated conduit.

11. In a method of making a flexible metal hose, the operations of providing a corrugated sheet metal tube having its corrugations extending around the periphery thereof to impart flexibility to said tube, providing a substantially cylindrical wire braid liner having an outside diameter as great as the inside diameter of said tube, applying squeezing pressure to the wall of said liner between smooth pressing instruments to smooth the inside of said liner so that said liner will have a minimum of surface roughness, one of said pressing instruments being applied to the outside of said liner while the other pressing instrument is inserted within said liner and applied against the inside thereof, disassociating said instruments from said liner, and inserting said liner into said corrugated tube.

12. In a method of making a flexible metal hose, the operations of providing a corrugated sheet metal tube having its corrugations extending around the periphery thereof to impart flexibility to said tube, providing a substantially cylindrical wire braid liner having an outside diameter as great as the inside diameter of said tube, inserting a first smooth pressing rod into said liner, applying squeezing pressure to the wall of said liner between said first pressing rod and second and third smooth pressing rods applied to the outside of said liner to smooth the inside of said liner so that said liner will have a minimum of surface roughness, said second and third rods being pressed inwardly toward said first rod at diametrically opposite positions around said liner, disassociating said rods from said liner, and inserting said liner into said corrugated tube.

13. In a method of making a flexible metal hose, the operations of providing a corrugated sheet metal tube having its corrugations extending around the periphery thereof to impart flexibility to said tube, providing a substantially cylindrical wire braid liner having an outside diameter as great as the inside diameter of said tube, inserting a first smooth pressing rod into said liner, applying squeezing pressure to the wall of said liner between said first rod and a second smooth pressing rod applied against the outside of said liner, to smooth the inside of said liner so that said liner will have a minimum of surface roughness, said rods being repeatedly pressed together and moved apart while said liner is inched around between said rods until the entire wall of said liner has been pressed smooth between said rods, disassociating said rods from said liner, and inserting said liner into said corrugated tube.

References Cited in the file of this patent

UNITED STATES PATENTS

| 756,140 | Reid | Mar. 29, 1904 |
| 1,314,333 | Kahn | Aug. 26, 1919 |
| 1,678,941 | Helman | July 31, 1928 |
| 2,150,471 | Van Vulpen | Mar. 14, 1939 |
| 2,444,988 | Guarnaschelli | July 13, 1948 |
| 2,761,203 | DeWitt | Sept. 4, 1956 |

FOREIGN PATENTS

| 159,143 | Germany | Mar. 14, 1905 |